United States Patent [19]

Lin

[11] Patent Number: 4,730,971

[45] Date of Patent: Mar. 15, 1988

[54] SPIKE PLATE FOR JOINING TWO OR MORE SEPARATE PARTS

[76] Inventor: Sinii Lin, No. 18-6, Shiao Ping Ding, Tanshui Town, Taipei Hsien, Taiwan

[21] Appl. No.: 779,283

[22] Filed: Sep. 23, 1985

[51] Int. Cl.$^4$ .......................... F16B 15/00; E04B 1/38
[52] U.S. Cl. .................................... 411/463; 411/466; 52/712
[58] Field of Search ............... 411/457–460, 411/461–463, 466, 452; 52/696, 712

[56] References Cited

U.S. PATENT DOCUMENTS

| Re. 28,427 | 5/1975 | Menge | 411/466 |
|---|---|---|---|
| 450,753 | 4/1891 | Cary | 411/466 |
| 3,277,768 | 10/1966 | Templin et al. | 411/463 |
| 3,703,304 | 11/1972 | Losee | 411/462 |
| 4,078,308 | 3/1978 | Becker | 411/466 |
| 4,527,933 | 7/1985 | Karkumaki et al. | 411/463 |
| 4,561,230 | 12/1985 | Rionda et al. | 52/712 |

FOREIGN PATENT DOCUMENTS

| 2951098 | 7/1980 | Fed. Rep. of Germany | 52/712 |
|---|---|---|---|
| 1274688 | 5/1972 | United Kingdom | 411/466 |
| 1442077 | 7/1976 | United Kingdom | 411/466 |

*Primary Examiner*—Neill Wilson
*Attorney, Agent, or Firm*—Ladas & Parry

[57] ABSTRACT

The present device is a dog nail comprised of a planar or angled body with a shock absorbent ridging about its periphery. Attached to and perpendicular of one end of the body is a concave spike which is V-shaped in lengthwise cross section. The body also includes at least one other spike which is integral of the body and may be pressed perpendicularly thereof. Both spikes are long and pointed and serve to grip two pieces of wood together to form a solid joint between the two.

29 Claims, 22 Drawing Figures

SPIKE PLATE FOR JOINING TWO OR MORE SEPARATE PARTS

BACKGROUND OF THE INVENTION (a) Field of the Invention

This invention relates to a dog nail mainly used to join wood or similar building materials. It is used to fasten L or T joints of post and cross bars, or similar window pieces, of wood building.

(b) Description of the Prior Art

In conventional buildings, L or T joints of posts and cross bars or similar window pieces are fastened with a long straight nail of which the pointed end is driven into the side surface of one piece of wood, and into the top surface of another piece. The firmness of the joint depends on the area and depth of the shank of the nail in the other piece of wood and the surface of the shank gripped by the fibers of the said piece of wood. Oftentimes, the head of the nail is so small that the nail is often driven out of the wood after having been driven in. It must be pulled out of the surface and driven in again. Furthermore, a nail which appears to be driven securely within both pieces of wood may not be and the joint will loosen after being used for a certain period of time.

Another type of fastening means used is a U-shaped fastener that looks like a staple and has sharp pointed ends that are driven into the side surfaces of an L joint as a reinforcement. This type of fastener can only serve as a reinforcement and can only be used after the joint is completed.

In short, a conventional L or T joint of two pieces of wood is secured by means of long nails and some are reinforced with U-shaped fasteners. The disadvantage of which construction is that with such nails and fasteners, the L or T joint is difficult to make and that the joint is not firm and durable.

SUMMARY OF THE INVENTION

The dog nail of this invention for joining wood or similar building material can be made of iron or alloy plate. It is made by punching material out into a planar or right-angled I, T, L or other shape. Commonly, dog nails comprise a body and a plurality of spikes. The said spikes are V-shaped in cross section and perpendicular to the body. The punched spike may be situated near the end rib of the body so as to mate in holding wood with the edge spike extending from the end edge and bent there. In addition, the said body may have several nail holes so that reinforcement can be made with conventional nails in special conditions.

BRIEF DESCRIPTION OF THE DRAWINGS

FIG. 21 is an enlarged view of end spike 23 as seen in FIG. 3.

DESCRIPTION OF THE PREFERRED EMBODIMENT

Figure 1:
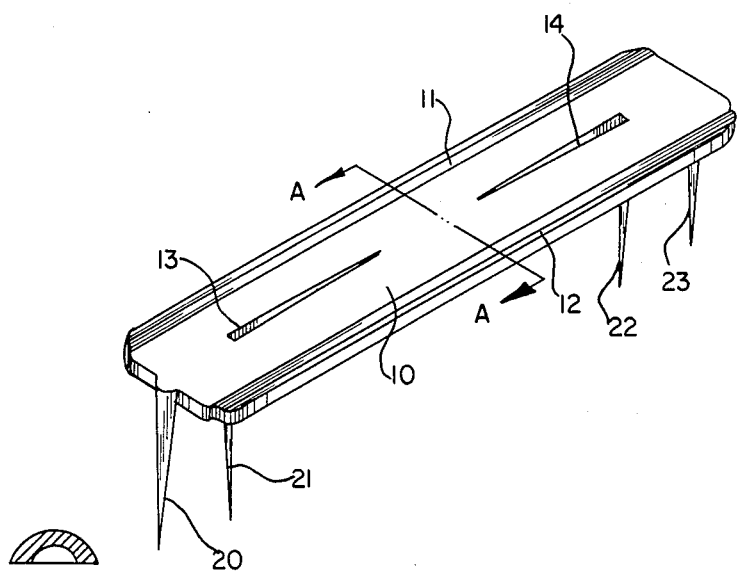
FIG. 1 is a vertical view of the first embodiment (plane, I-shaped) of this invention.
Figure 19:
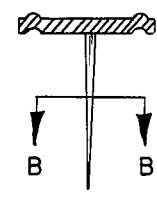
FIG. 19 is a sectional view along line A—A of FIG. 1.
Figure 20:
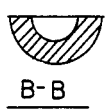
FIG. 20 is a sectional view along line B—B of FIG. 19.

As shown in FIG. 1, the first embodiment is plane and I shaped. It comprises a plate (body) 10 and four spikes 20, 21, 22, 23. The body 10 has two reinforcing ribs 11, 12. Its section is shown in the detail by A—A line in FIG. 19. The body 10 also has two punched holes 13, 14 left after the spikes 21, 22, 23 are perpendicular to the body 10. The detail by B—B line in FIG. 20 is an enlarged cross-section of the spikes 20, 21, 22, 23. The cross-section of spikes is V-shaped which results in increased contact area with the wood and greater gripping force of the wood fibers. The punched holes 13, 14 are ready for reinforcing with conventional nails when the spikes 20, 21, 22, 23 go away or when reinforcement is needed.

Figure 2:
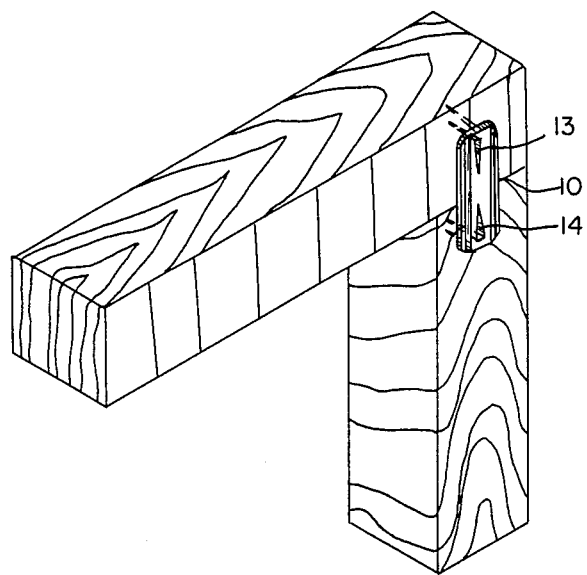
FIG. 2 illustrates the application of the first embodiment as shown in FIG. 1.

FIG. 2 shows the application of the first embodiment. The spikes 20, 21, 22, 23 will be driven alternately with a hammer on the body 10 for holding two pieces of wood together. Additional nails may be driven through the holes 13, 14 into the wood as reinforcement if necessary.

Figure 3:
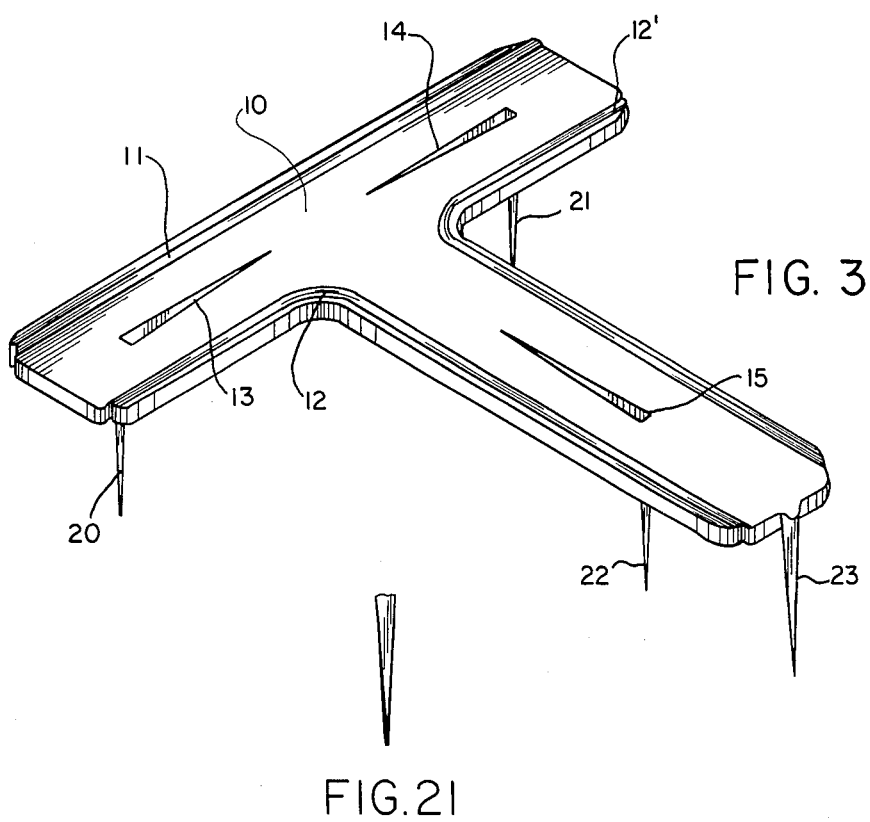
FIG. 3 is a vertical view of the second embodiment (plane, T-shaped) of this invention.
Figure 4:
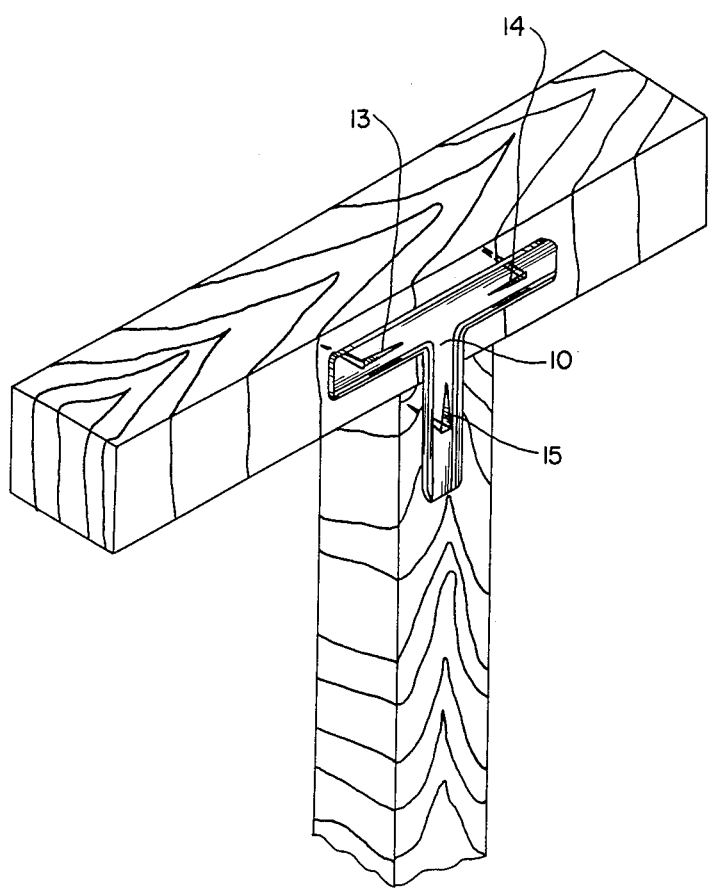
FIG. 4 illustrates the application of the second embodiment as shown in FIG. 3.

FIGS. 3 and 4 show the second embodiment of this invention. It comprises a plane, T shaped body 10 and four spikes 20, 21, 22, 23. The body 10 also has reinforcing ribs 11, 12, 12' on the edge and three punched holes 13, 14, 15. The ribs 11, 12, 12' and the spikes 20, 21, 22, 23 are formed in the same way as those of the first embodiment. The application of the second embodiment is also same as the first embodiment. FIG. 21 is an enlarged view of spike 23 as shown in FIG. 3.

Figure 5:
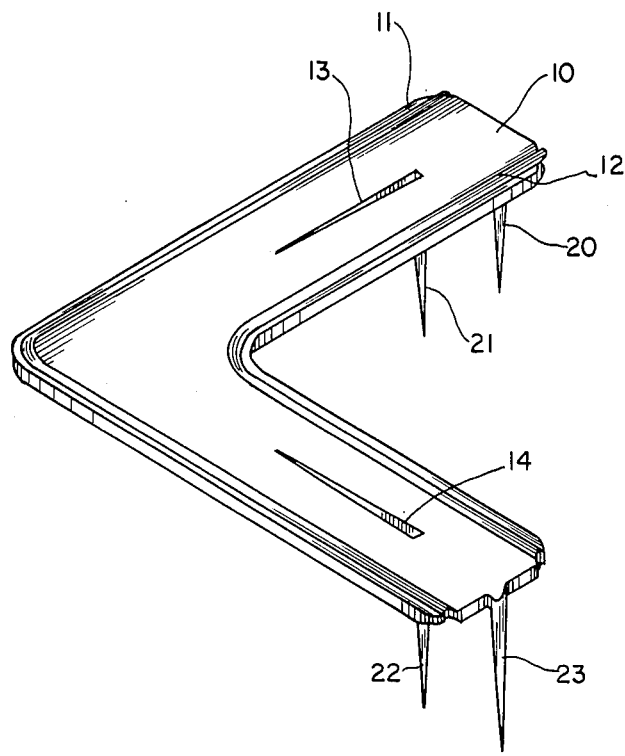
FIG. 5 is a vertical view of the third embodiment (plane, L-shape) of this invention.
Figure 22:
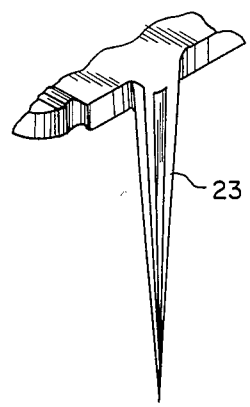
FIG. 22 is an enlarged view of end spike 23 as seen in FIG. 5.
Figure 6:
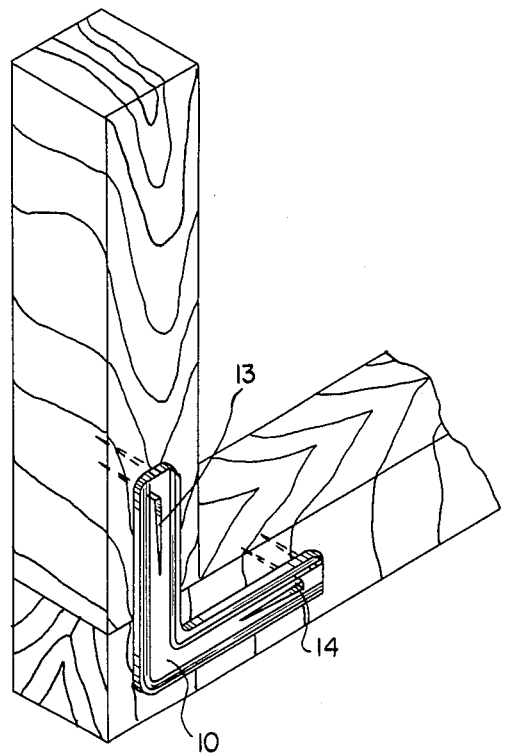
FIG. 6 illustrates the application of the third embodiment as shown in FIG. 5.

The third embodiment is shown in FIG. 5. It's body 10 is plane and L shaped and has also two reinforcing ribs 11, 12, two punched holes 13, 14 and four spikes 20, 21, 22, 23. Its construction is similar to the first embodiment and its application is shown in FIG. 6. FIG. 22 is an enlarged view of spike 23 as shown in FIG. 5.

Figure 7:
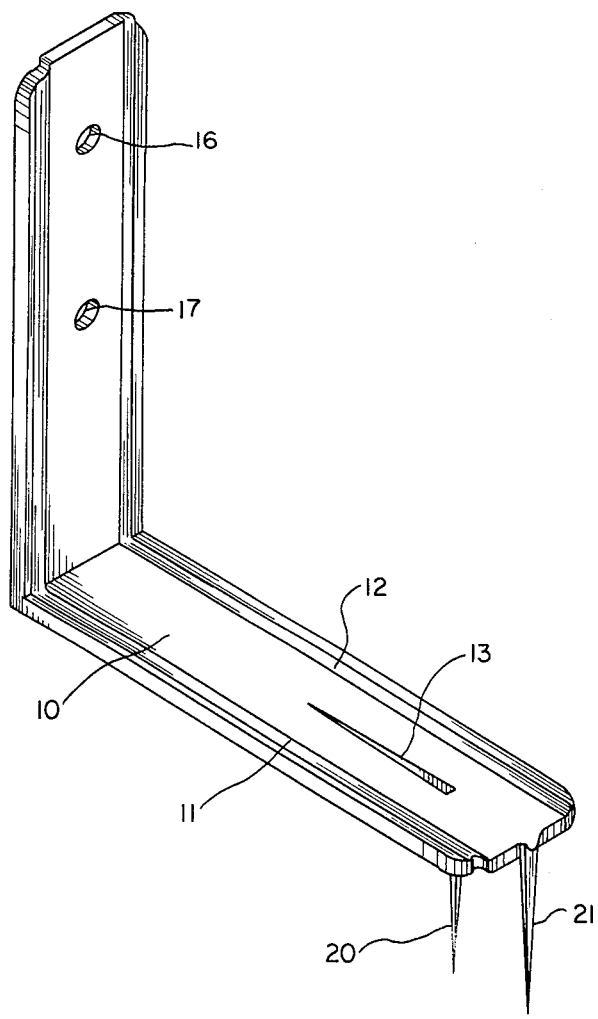
FIG. 7 is a vertical view of the fourth embodiment (right-angled, outside spiked, I-shaped) of this invention.
Figure 8:
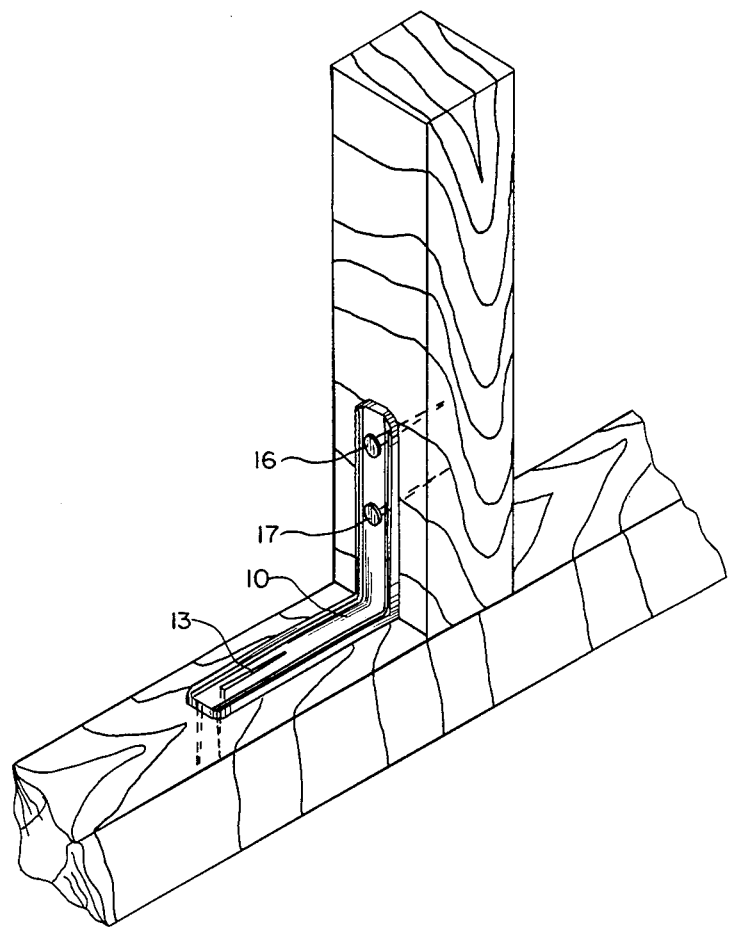
FIG. 8 illustrates the application of the fourth embodiment as shown in FIG. 7.
Figure 9:
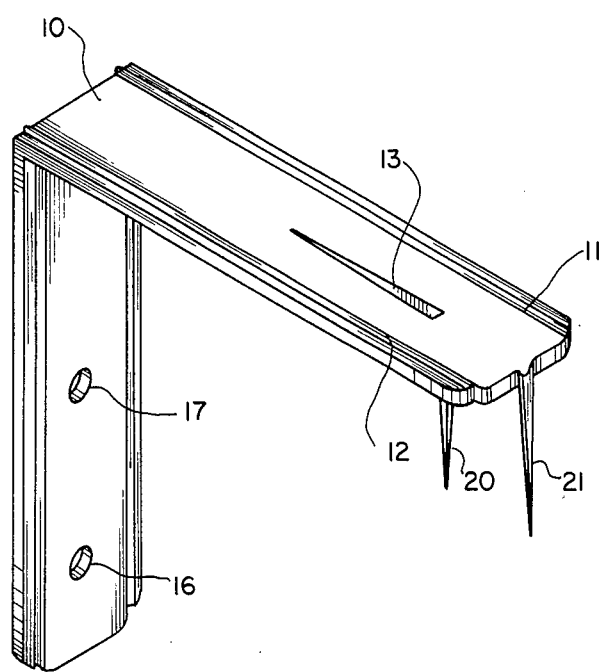
FIG. 9 is a vertical view of the fifth embodiment (right-angled, inside-spiked, I-shaped) of this invention.
Figure 10:
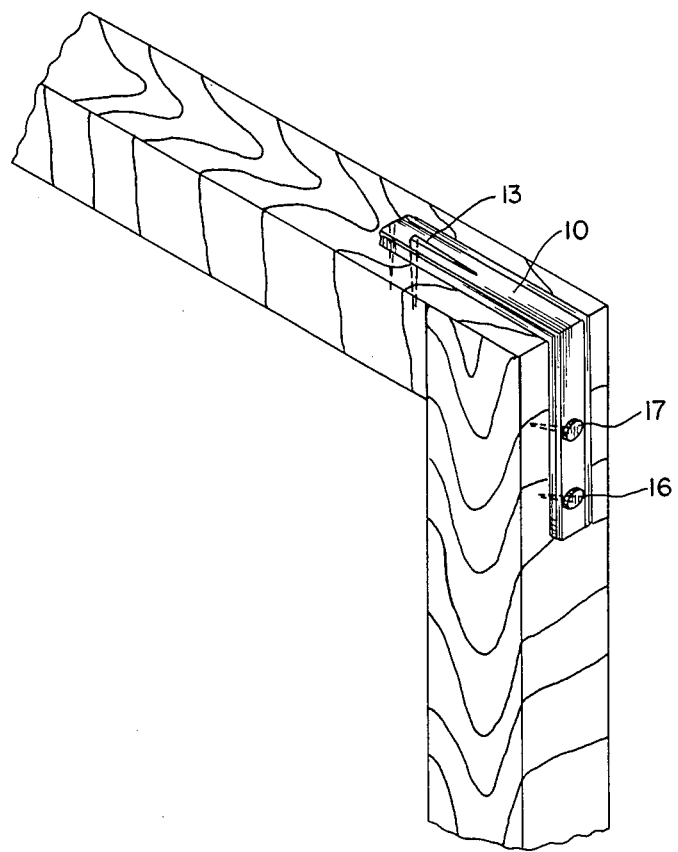
FIG. 10 illustrates the application of the fifth embodiment as shown in FIG. 9.
Figure 11:
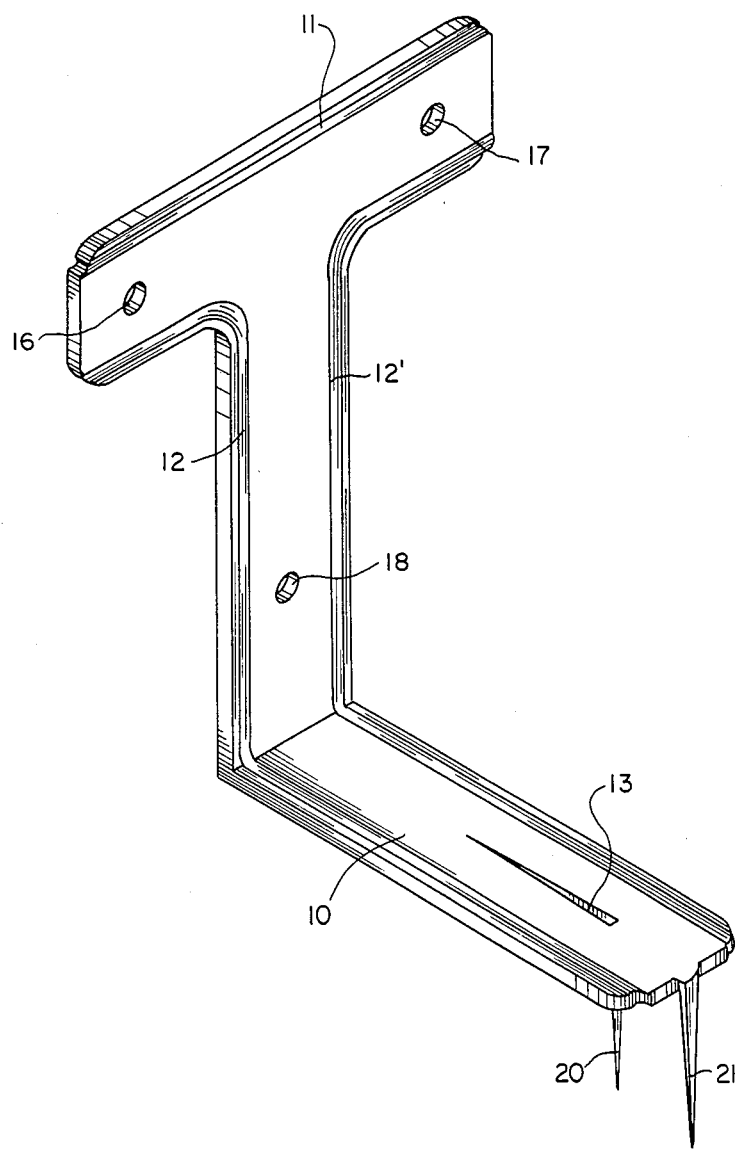
FIG. 11 is a vertical view of the sixth embodiment (right-angled, outside-spiked, T-shaped) of this invention.
Figure 12:
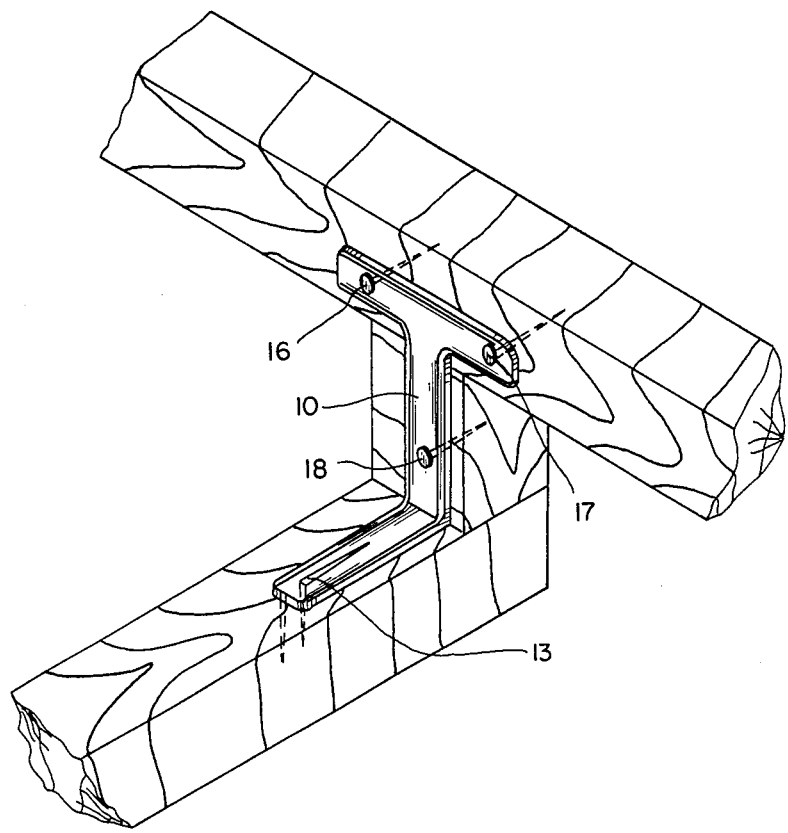
FIG. 12 illustrates the application of the sixth embodiment as shown in FIG. 11.
Figure 13:
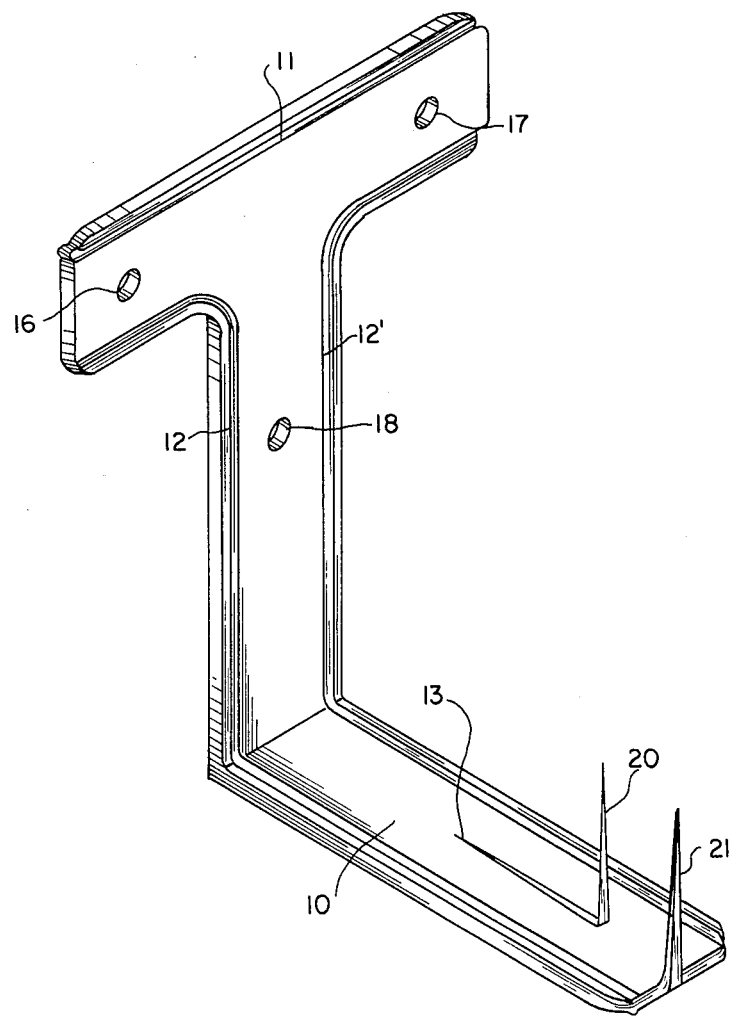
FIG. 13 is a vertical view of the seventh embodiment (right-angled, inside-spiked, T-shaped) of this invention.
Figure 14:
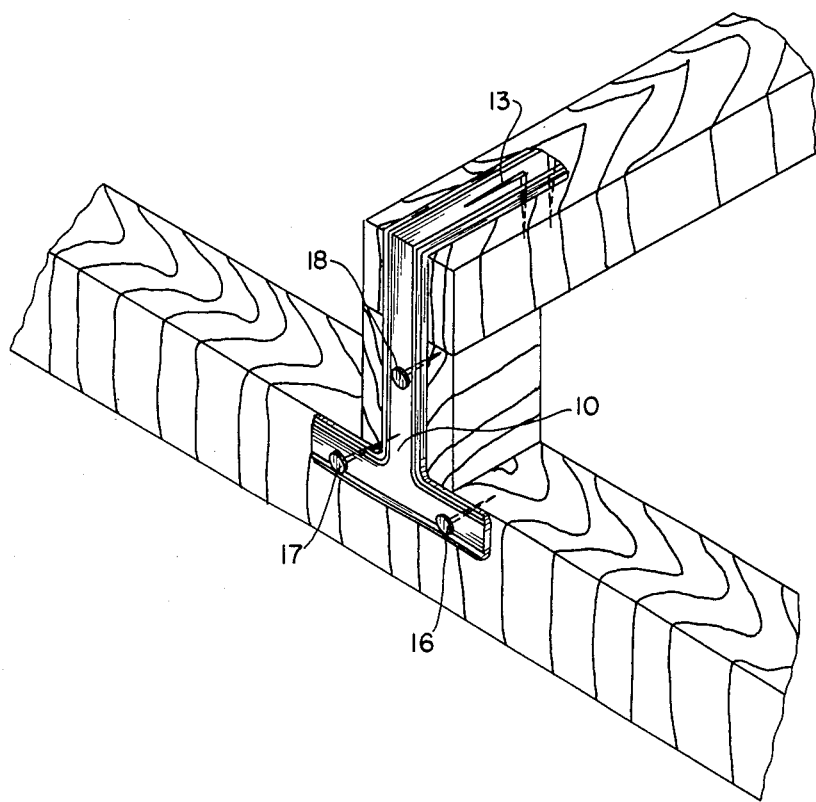
FIG. 14 illustrates the application of the seventh embodiment as shown in FIG. 13.

The fourth and fifth embodiments are shown respectively in FIGS. 7 and 9. They comprise a body 10 and two spikes 20, 21. Each of the bodies 20 has two reinforcing ribs 11, 12, a punched hole 13 left when the spike 20 is formed, and two nail holes 16, 17. They are all formed in right angle. The only difference between the fourth and fifth embodiments is that the fourth embodiment has spikes 20, 21 on the outside and the fifth embodiment on the inside. They are suitable for holding two pieces of wood respectively on the inside and outside of the joint. The application of these two embodiments is shown in FIGS. 8 and 10. The spikes 20, 21 are driven first into one piece of wood and nails are then driven through the nail holes 16, 17 into another piece of wood so as to hold them together.

The sixth and seventh embodiments are shown in FIGS. 11 through 14. The T-shaped body 10 has reinforcing ribs 11, 12, 12' on the edge but is bent into a right angle. The body 10 also has a punched hole 13 and three nail holes 16, 17, 18. The difference between the sixth and seventh embodiments is that one is for inside application and the other for outside application. Their construction is the same as that of the fourth and fifth embodiments.

Figure 15:
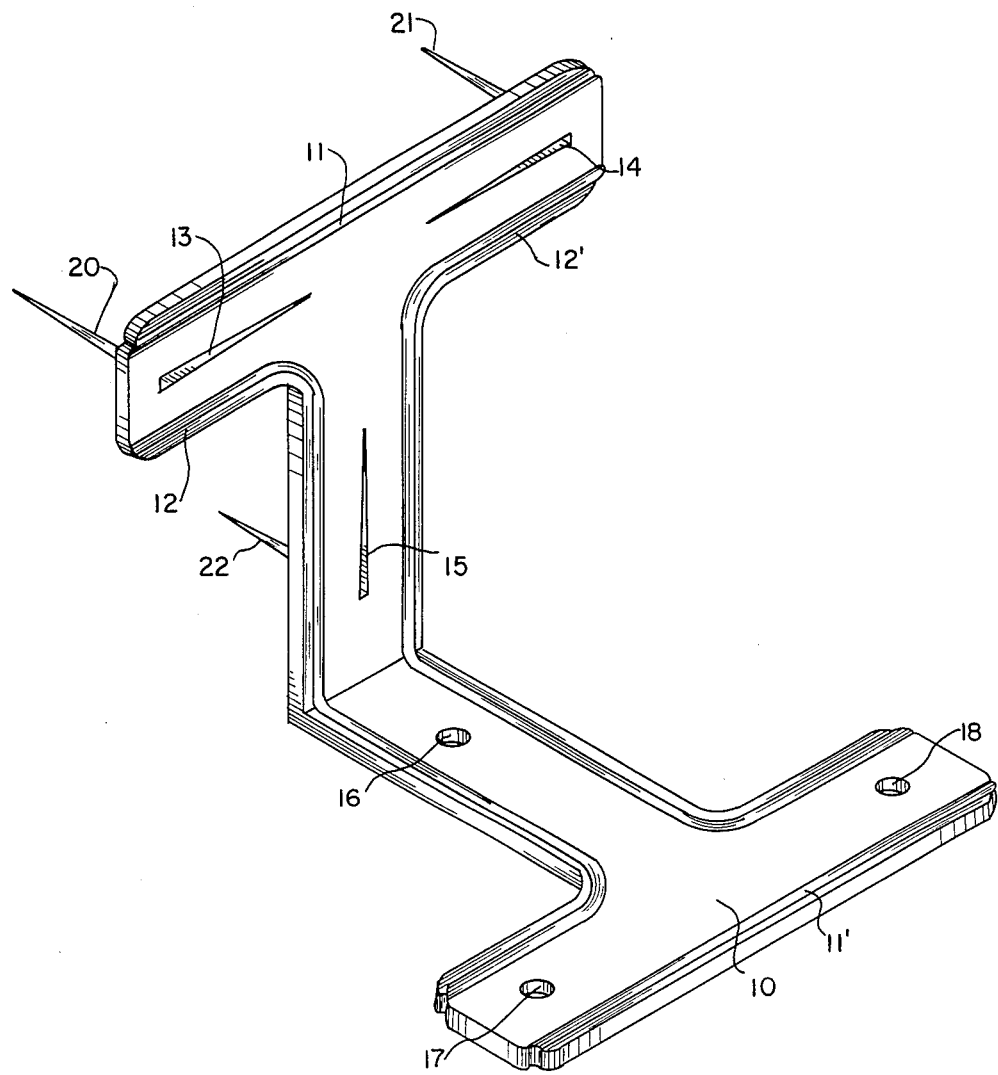
FIG. 15 is a vertical view of the eighth embodiment (right-angled, outside-spiked, double T-shaped) of this invention.
Figure 16:
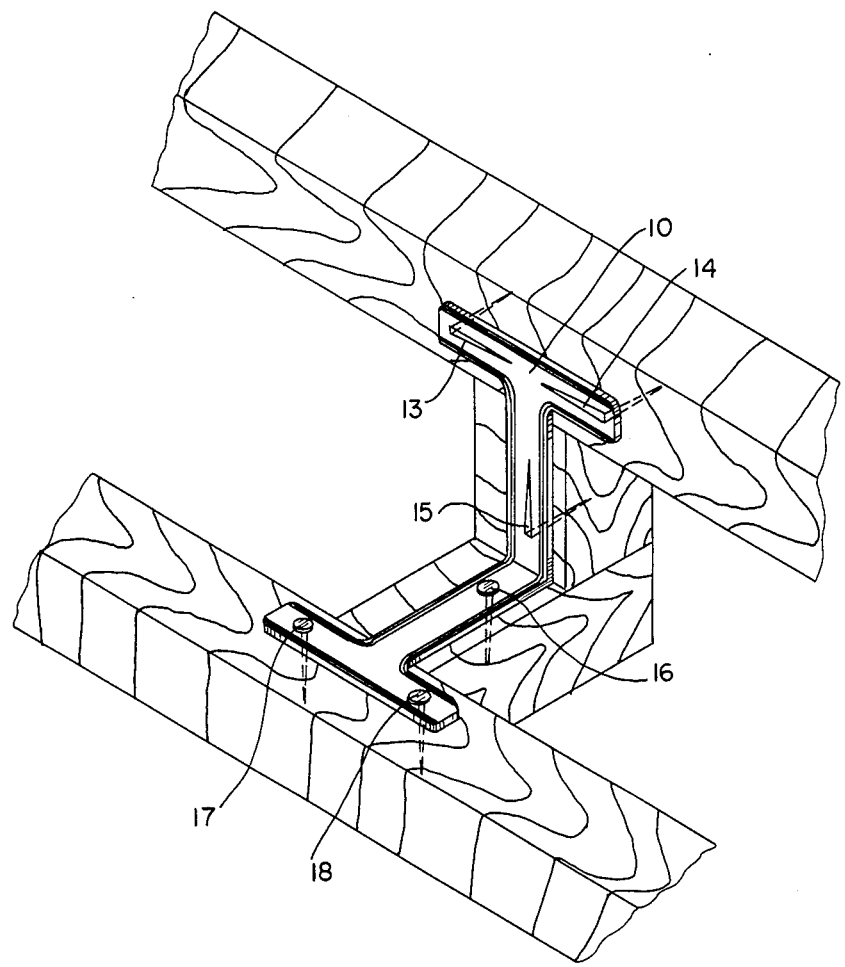
FIG. 16 illustrates the application of the eighth embodiment as shown in FIG. 15.
Figure 17:
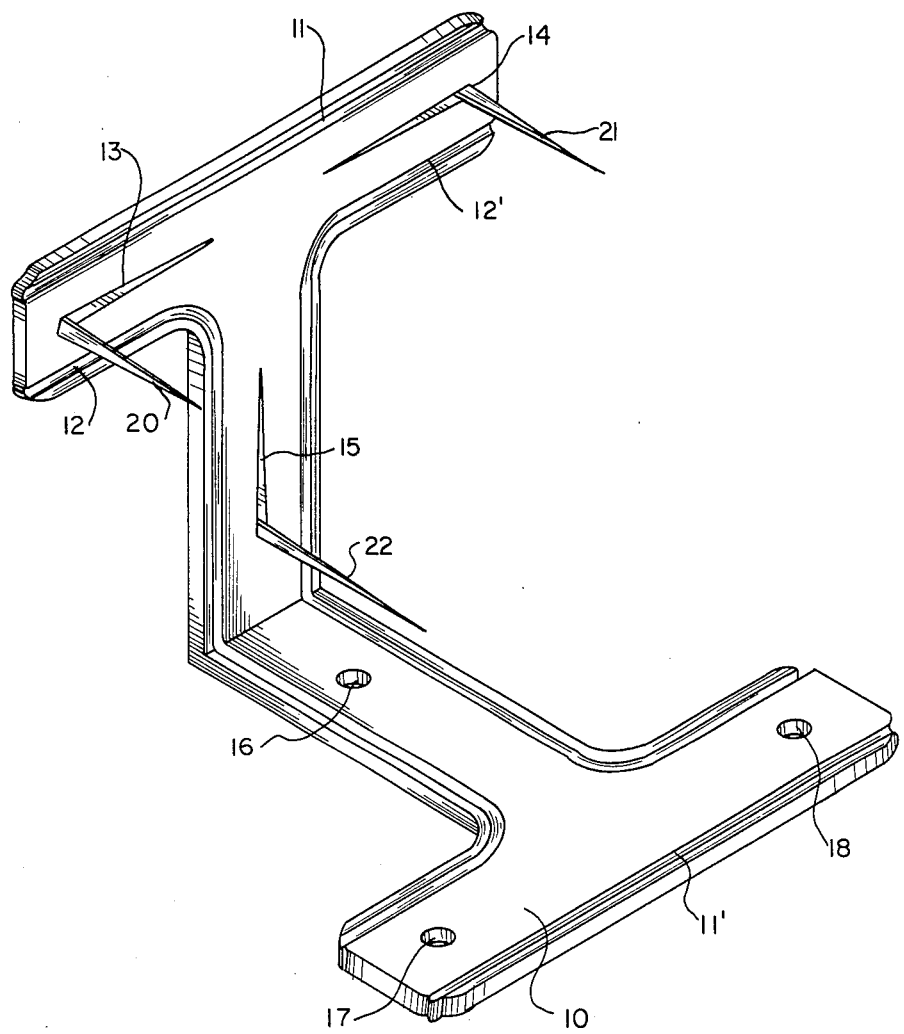
FIG. 17 is a vertical view of the ninth embodiment (right-angled, inside-spiked, double T-shaped) of this invention.
Figure 18:
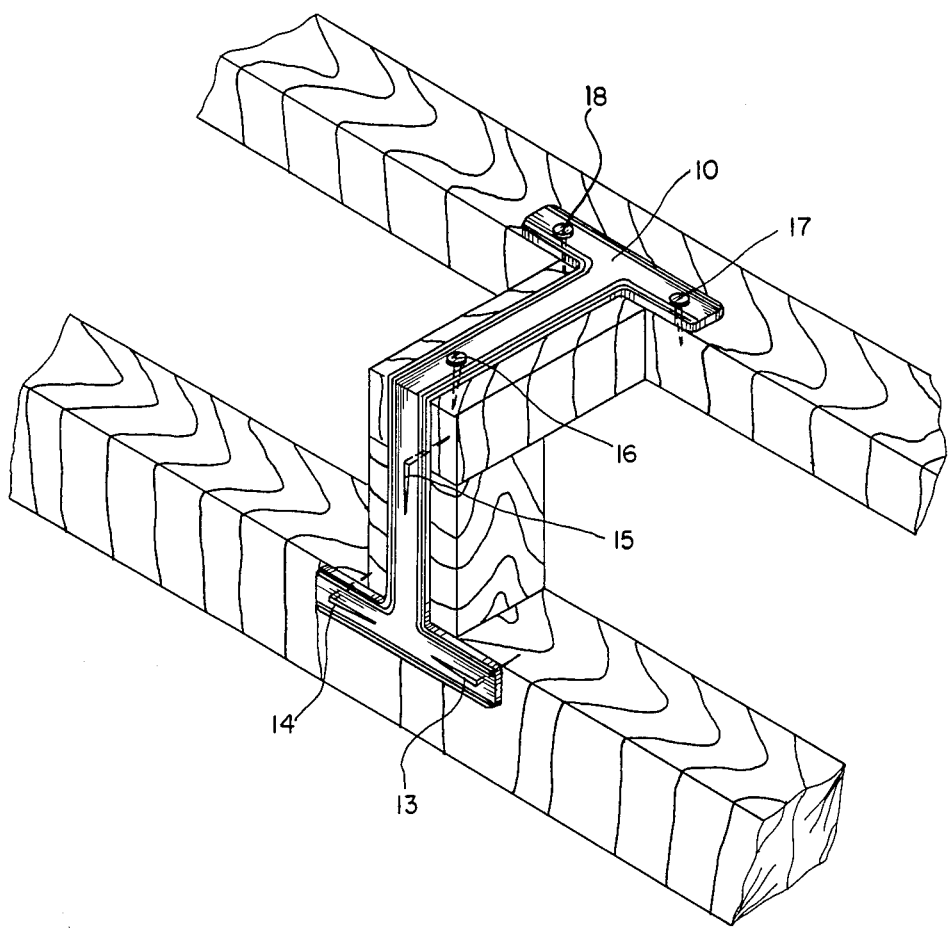
FIG. 18 illustrates the application of the ninth embodiment as shown in FIG. 17.

The eighth and ninth embodiments are shown in FIGS. 15 and 17. The body 10 is in double T-shape and bent at the bottom into a right angle. The body 10 has four reinforcing ribs 11, 11', 12, 12', three punched holes 13, 14, 15, three nail holes 16, 17, 18 and three spikes 20, 21, 22. Their construction is the same as the fourth, fifth, sixth and seventh embodiments and their application is shown in FIGS. 16 and 18.

From the above, it is clear that the dog nail of this invention which has spikes and nails to be driven into two pieces of wood can provide a firm joining means.

What is claimed is:

1. A dog nail body having an upper surface:
   a lower surface; and
   a first end joining said upper surface and said lower surface, said upper surface having at least two opposing sides which extend at an angle from said first end and define generally along their borders a raised surface, said lower surface having at least two opposing sides located directly opposite of said two opposing sides of said upper surface, said two opposing sides of said lower surface defining an indentation along their borders, said indentation disposed opposite of said raised surface on said upper surface;
   at least one body spike having a top end and a bottom end opposite said top end, said top end being formed integral of said body of said dog nail and situated between said raised surfaces on said opposing sides of said top surface, said body spike being disposed away from said body of said dog nail to extend at an angle from said upper and said lower surfaces;
   at least one end spike having a top end and a bottom end opposite said top end, said top end of said at least one end spike being formed integral with said first end of said dog head and extending at an angle from said upper and said lower surfaces, said end spike and said body spike being both generally concave along their lengths and narrowing from their said top ends to their bottom ends such that said bottom ends each form a sharp point, said end spike and said body spike each forming a V in lengthwise cross section.

2. A dog nail body having an upper surface;
   a lower surface;
   a first end joining said upper surface and said lower surface, said upper surface having at least two opposing sides which extend at an angle from said first end and define generally along their borders a raised surface, said lower surface having at least two opposing sides located directly opposite of said two opposing sides of said upper surface, said two opposing sides of said lower surface defining an indentation along their borders, said indentation disposed opposite of said raised surface on said upper surface;
   at least one body spike having a top end and a bottom end opposite said top end, said top end being formed integral with said body of said dog nail and situated between said raised surfaces on said opposing sides of said top surface, said body spike being disposed away from said body of said dog nail to extend at an angle from said upper and said lower surfaces;
   at least one end spike having a top end and bottom end opposite said top end, said top end of said at least one end spike being formed integral with said first end of said dog head and extending at an angle form said upper and said lower surfaces, said end spike and said body spike being both generally concave along their lengths and narrowing from their said top ends to their said bottom ends such that said bottom ends each form a sharp point, said end spike and said body spike each forming a V in lengthwise cross section the concave portion of said at least one end spike confronting said concave portion of said at least one body spike.

3. The dog nail of claim 2 wherein said body is rectangular in shape and includes a second end opposite said first end, said second end being perpendicular of said opposing sides, said raised surfaces and said indentations.

4. A rectangular dog nail body having an upper surface;
   a lower surface;
   a first end joining said upper surface and said lower surface, said upper surface having at least two opposing sides which extend at an angle from said first end and define generally along their borders a raised surface, said lower surface having at least two opposing sides located directly opposite of said two opposing sides of said upper surface, said two opposing sides of said lower surface defining an indentation along their borders, said indentation disposed opposite of said raised surface on said upper surface;
   a second end opposite said first end, said second end being perpendicular of said opposing sides, said raised surfaces and said indentations;
   a second end spike, said second end spike being formed integral with said second end, said concave portion of said at least one end spike confronting said concave portion of said second end spike;
   a body spike having a top end and a bottom end opposite said top end, said top end being formed integral with said body of said dog nail and situated between said raised surfaces on said opposing sides of said top surface, said body spike being disposed away from said body of said dog nail to extend at an angle from said upper and said lower surfaces; at least one end spike having a top end and a bottom end opposite said top end, said top end of said at least one end spike being formed integral with said first end of said dog head and extending at an angle from said upper and said lower surfaces, said end spike and said body spike being both generally concave along their lengths and narrowing from their said top ends to their said bottom ends such that said bottom ends each form a sharp point, said end spike and said body spike each forming a V in lengthwise cross section.

5. The dog nail of claim 2 further including a second body spike formed integral of said body.

6. The dog nail according to claim 5 wherein said second body spike is situated directly opposite of said first body spike and proximate said second end.

7. The dog nail of claim 4 wherein said body is rectangular in shape and includes a second end opposite said first end, said second end being perpendicular of said opposing sides, said raised surfaces and said indentations.

8. The dog nail of claim 1 further including a second body spike formed intergral of said body.

9. The dog nail according to claim 8 wherein said second body spike is situated directly opposite of said first body spike and proximate said second end.

10. The dog nail according to claim 1 wherein said concavity of said at least one end spike and said at least one body spike is V-shaped.

11. The dog nail according to claim 1 wherein said concavity of said at least one end spike and said at least one body spike is U-shaped.

12. The dog nail according to claim 1 wherein said body forms a planar, right angle and includes a second end, said second end being situated 90 degrees of said first end, said raised surface of said upper surface and said indentation of said lower surface defining the outline of said right angle of said body between said first end and second end.

13. The dog nail according to claim 1 wherein said body forms a nonplanar right angle and includes a second end situated 90 degrees of said first end, said raised surface of said top surface and said indentation of said bottom surface defining the periphery of each body between said first and said second end, said body further defining at least two openings near said second end.

14. The dog nail according to claim 1 wherein said concavity of said at least one end spike and said at least one body spike is C-shaped.

15. The dog nail according to claim 1 wherein said at least one end spike and said at least one body spike extend perpendicular of said body.

16. The dog nail according to claim 2 wherein said concavity of said at least one end spike and said at least one body spike is V-shaped.

17. The dog nail according to claim 2 wherein said concavity of said at least one end spike and said at least one body spike is U-shaped.

18. The dog nail according to claim 2 wherein said body forms a planar, right angle and includes a second end, said second end being situated 90 degrees of said first end, said raised surface of said upper surface and said indention of said lower surface defining the outline of said right angle of said body between said first end and said second end.

19. The dog nail according to claim 2 wherein said body forms a nonplanar right angle and includes a second end situated 90 degrees of said first end, said raised surface of said top surface and said indentation of said bottom surface defining the periphery of said body between said first and said second end, said body further defining at least two openings near said second end.

20. The dog nail according to claim 2 wherein said concavity of said at least one end spike and said at least one body spike is C-shaped.

21. The dog nail according to claim 2 wherein said at least one end spike and said at least one body spike extend perpendicular of said body.

22. A dog nail body having an upper surface;
a lower surface;
a first end joining said upper surface and said lower surface, said upper surface having at least two opposing sides which extend at an angle from said first end and define generally along their borders a raised surface, said lower surface having at least two opposing sides located directly opposite of said two opposing sides of said upper surface, said two opposing sides of said lower surface defining an indentation along their borders, said indentation disposed opposite of said raised surface on said upper surface;
at least one body spike having a top end and a bottom end opposite said top end, said top end being formed integral with said body of said dog nail and situated between said raised surfaces on said opposing sides of said top surface, said body spike being disposed away from said body of said dog nail to extend at an angle from said upper and said lower surfaces;
at least one end spike being situated directly opposite of said at least one body spike and having a top end and a bottom end opposite said top end, said top end of said at least one end spike being formed integral with said first end of said dog head and extending at an angle from said upper and said lower surfaces, said end spike and said body spike being both generally concave along their lengths and narrowing from their said top ends to their said bottom ends such that said bottom ends each form a sharp point, said end spike and said body spike each forming a V in lengthwise cross section.

23. A T-shaped dog nail body having an upper surface;
a lower surface;
a first end joining said upper surface and said lower surface, said upper surface having at least two opposing sides which extend at an angle from said first end and define generally along their borders a raised surface, said lower surface having at least two opposing sides located directly opposite of said two opposing sides of said upper surface, said two opposing sides of said lower surface defining an indentation along their borders, said indentation disposed opposite of said raised surface on said upper surface, said T-shape including a second and a third end, said second end and said third end disposed opposite of each other and perpendicular of said first end, said opposing sides of said upper surface and said lower surface and said raised surface of said upper surface and said indentation of said lower surface defining the T-shape of said body between said first, second and third ends;

at least one body spike having a top end and a bottom end opposite said top end, said top end being formed integral with said body of said dog nail and situated between said raised surfaces on said opposing sides of said top surface, said body spike being disposed away from said body of said dog nail to extend at an angle for said upper and said lower surfaces;

at least one end spike having a top end and a bottom end opposite said top end, said top end of said at least one end spike being formed integral of said first end of said dog head and extending at an angle from said upper and said lower surfaces, said end spike and said body spike being both generally concave along their lengths and narrowing from their said top ends to their said bottom ends such that said bottom ends each form a sharp point, said end spike and said body spike each forming a V in lengthwise cross section.

24. A T-shaped dog nail body having an upper surface;
a lower surface;
a first end joining said upper surface and said lower surface, said upper surface having at least two opposing sides which extend at an angle from said first end and define generally along their borders a raised surface, said lower surface having at least two opposing sides located directly opposite of said two opposing sides of said upper surface, said two opposing sides of said lower surface defining an indentation along their borders, said indentation disposed opposite of said raised surface and said upper surface said T-shape including a second and a third end, said second end and said third end disposed opposite of each other and perpendicular of said first end, said opposing sides of said upper surface and said lower surface and said raised surface of said upper surface and said indentation of said lower surface defining the T-shape of said body between said first, second and third ends;

a body spike having a top end and a bottom end opposite said top end, said top end being formed integral with said body of said dog nail and situated between said raised surfaces on said opposing sides of said top surface, said body spike being disposed away from said body of said dog nail to extend at an angle from said upper and said lower surfaces;

a second and a third body spike, said second body spike being located near said second end, said third body spike being located near said third end;

at least one end spike having a top end and a bottom end opposite said top end, said top end of said at least one end spike being formed integral with said first end of said dog head and extending at an angle from said upper and said lower surfaces, said end spike and said body spike being both generally concave along their lengths and narrowing from their said top ends to their said bottom ends such that said bottom ends each form a sharp point, said end spike and said body spike each forming a V in lengthwise cross section.

25. A dog nail body having an upper surface;
a lower surface;
a first end joining said upper surface and said lower surface, said upper surface having at least two opposing sides which extend at an angle from said first end and define generally along their borders a raised surface, said lower surface having at least two opposing sides located directly opposite of said two opposing sides of said upper surface, said two opposing sides of said lower surface defining an indentation along their borders, said indentation disposed opposite of said raised surface on said upper surface;

at least one body spike having a top end and a bottom end opposite said top end, said top end being formed integral with said body of said dog nail and situated between said raised surfaces on said opposite sides of said top surface, said body spike being disposed away from said body of said dog nail to extend at an angle from said upper and said lower surfaces;

at least one end spike having a top end and a bottom end opposite said top end, said top end of said at least one end spike being formed integral with said first end of said dog head and extending at an angle from said upper and said lower surfaces, said end spike and said body spike being both at least in length one-quarter of the length of said body and generally concave along their lengths and narrowing from their said top ends to their said bottom ends such that said bottom ends each form a sharp point, said end spike and said body spike each forming a V in lengthwise cross section.

26. A dog nail body forming a planar right angle and having an upper surface;
a lower surface;
a first end joining said upper surface and said lower surface, said upper surface having at least two opposing sides which extend at an angle from said first end and define generally along their borders a raised surface, said lower surface having at least two opposing sides located directly opposite of said two opposing sides of said upper surface, said two opposing sides of said lower surface defining an indentation along their borders, said indentation disposed opposite of said raised surface on said upper surface;

a second end, said second end being situated 90 degrees of said first end, said raised surface of said upper surface and said indentation of said lower surface defining the outline of said right angle of said body between said first end and said second end;

a body spike having a top end and a bottom end opposite said top end, said top end being formed integral with said body of said dog nail and situated between said raised surfaces on said opposing sides of said top surface, said body spike being disposed away from said body of said dog nail to extend at an angle from said upper and said lower surfaces;

a second body spike said second body spike being situated near said second end;

an end spike having a top end and a bottom end opposite said top end, said top end of said at least one end spike being formed integral with said first end of said dog head and extending at an angle form said upper and said lower surfaces, said end spike and said body spike being both generally concave along their lengths and narrowing from their said top ends to their said bottom ends such that said bottom ends each form a sharp point, said end spike and said body spike each forming a V in lengthwise cross section;

a second end spike, said second end spike being formed integral said second end.

27. A rectangular dog nail body having an upper surface;
a lower surface;
a first end joining said upper surface and said lower surface, said upper surface having at least two opposing sides which extend at an angle from said first end and define generally along their borders a raised surface, said lower surface having at least two opposing sides located directly opposite of said two opposing sides of said upper surface, said two opposing sides of said lower surface defining an indentation along their borders, said indentation disposed opposite of said raised surface on said upper surface;
a second end opposite siad first end, said second end being perpendicular of said opposing sides, said raised surfaces and said indentations;
a T-shaped body portion, said T-shaped body portion being integral said second end and at a nonplanar angle with respect to said body, said T-shaped portion having a right end and a left end opposing said right end, said right end and said left end disposed at an angle with respect to said first end, said raised surface on said top surface and said indentation of said bottom surface extending along the periphery joining said first end, said right end, and said left end, said T-shaped portion including at least one opening in its surface;
at least one body spike having a top end and at bottom end opposite said top end, said top end being formed integral with said body of said dog nail and situated between said raised surfaces on said opposing sides of said top surfaces, said body spike being disposed away from said body of said dog nail to extend at an angle from said upper and said lower surfaces;
at least one end spike having a top end and a bottom end opposite said top end, said top end of said at least one end spike being formed integral with said first end of said dog head and extending at an angle from said upper and said lower surfaces, said end spike and said body spike being both generally concave along their lengths and narrowing from their said top ends to their said bottom ends such that said bottom ends each form a sharp point, said end spike and said body spike each forming a V in lengthwise cross section.

28. A dog nail comprised of a body, said body being comprised of first and second T-shaped portions each having a central stem with a bottom end and a top crosspiece attached to said central stem opposite said bottom end of said stem, said bottom end of said stem of said first T-shaped portion being connected at a right angle to said bottom end of said second T-shaped stem portion, said cross pieces of said T-shaped portions each including a right end and a left end disposed opposite of said right end; at least one body spike extending perpendicular of and formed integral of said first T-shaped portion, said second T-shaped portion defining in its surface at least one opening, said first and said second T-shaped portions defining between said left and said right ends along the borders of said stems and said crosspieces a ridge defining on its opposite side an indentation which also defines the borders of said first and said second T-shaped portions between said ends along said cross pieces and stems.

29. The dog nail according to claim 28 wherein said body spike extends at least one-quarter of the length of said first T-shaped portion and includes a top end and a bottom end, said top end of said spike being intergral of said first T-shaped portion and wider than said bottom end, said body spike being concave along its length and V-shaped in lengthwise crosssection.

* * * * *